United States Patent
Lewandowski et al.

(10) Patent No.: US 12,139,194 B2
(45) Date of Patent: Nov. 12, 2024

(54) SYSTEMS AND METHODS FOR PROVIDING ALTERNATIVE VIEWS FOR BLOCKED REAR AND SIDE VIEW MIRRORS

(71) Applicant: Ford Global Technologies, LLC, Dearborn, MI (US)

(72) Inventors: Andrew Denis Lewandowski, Sterling Heights, MI (US); Keith Weston, Canton, MI (US); Jordan Barrett, Milford, MI (US); Brendan Diamond, Grosse Pointe, MI (US); Michael Alan Mcnees, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 17/816,241

(22) Filed: Jul. 29, 2022

(65) Prior Publication Data
US 2024/0034407 A1    Feb. 1, 2024

(51) Int. Cl.
*B62D 15/02* (2006.01)
*B60Q 9/00* (2006.01)
*G06V 20/59* (2022.01)
*H04N 7/18* (2006.01)
*H04N 23/667* (2023.01)

(52) U.S. Cl.
CPC ............ *B62D 15/025* (2013.01); *B60Q 9/00* (2013.01); *G06V 20/59* (2022.01); *H04N 7/181* (2013.01); *H04N 23/667* (2023.01)

(58) Field of Classification Search
CPC ........ B62D 15/025; B60Q 9/00; G06V 20/59; H04N 7/181; H04N 23/667
USPC ......................................................... 701/42
See application file for complete search history.

(56) References Cited

U.S. PATENT DOCUMENTS

| | | |
|---|---|---|
| 2019/0071029 A1 | 3/2019 | Choi et al. |
| 2019/0389385 A1* | 12/2019 | Diedrich .................. B60R 1/12 |
| 2021/0362724 A1 | 11/2021 | Stein et al. |
| 2022/0080958 A1 | 3/2022 | Song et al. |

OTHER PUBLICATIONS

Jeramie Bianchi, To Mirror or Not to Mirror: How Camera Monitoring Systems are Expanding the Driver's Perspective, Automotive, Technical articles, May 2, 2018, 1-4.
Harman, E-Mirror External Rear and Side-View, Mar. 15, 2022, 1-2.
Nissan Motor Corporation, Blind Spot Warning, 1-2.

* cited by examiner

*Primary Examiner* — Jacob M Amick
*Assistant Examiner* — Omar Morales
(74) *Attorney, Agent, or Firm* — Frank Lollo; Eversheds Sutherland (US) LLP

(57) ABSTRACT

The disclosure is generally directed to systems and methods for automatically detecting internally blocked rear and side view mirrors. An example method to detect an obstruction may include detecting via sensors in the vehicle an obstruction preventing a driver from viewing a region of interest associated with a mirror, determining a permanence associated with the obstruction, and switching to a camera mode in lieu of the mirror when the obstruction has a permanence beyond a threshold.

19 Claims, 5 Drawing Sheets

SYSTEMS AND METHODS FOR PROVIDING ALTERNATIVE VIEWS FOR BLOCKED REAR AND SIDE VIEW MIRRORS

FIELD

This disclosure generally relates to vehicles, and more particularly relates to systems and methods for detecting and alleviating blocked rear and side view mirrors.

BACKGROUND

Drivers typically must have passengers or other loads in vehicles that obfuscate visibility of rear and side view mirrors due to internal movements of passengers, packages that fill all available space in the vehicle and the like. Unfortunately, such obfuscation can result in dramatically reduced visibility with respect to rear view and side mirrors. For example, if a driver is moving a large object that necessarily takes up space within eye level of the driver, often some of the rear and side view mirrors will be obfuscated. A potential concern with blocked mirrors includes being unable to see vehicles and objects in a blind spot, being unable to back up or to change lanes with full visibility. If a vehicle is loaded with many passengers, the same issues may be present in that the internal blockage of a preferred mirror may cause visibility issues and impact driving choices.

Thus, it is desirable to provide solutions that address the need for alleviating internally blocked rear and side view mirrors.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
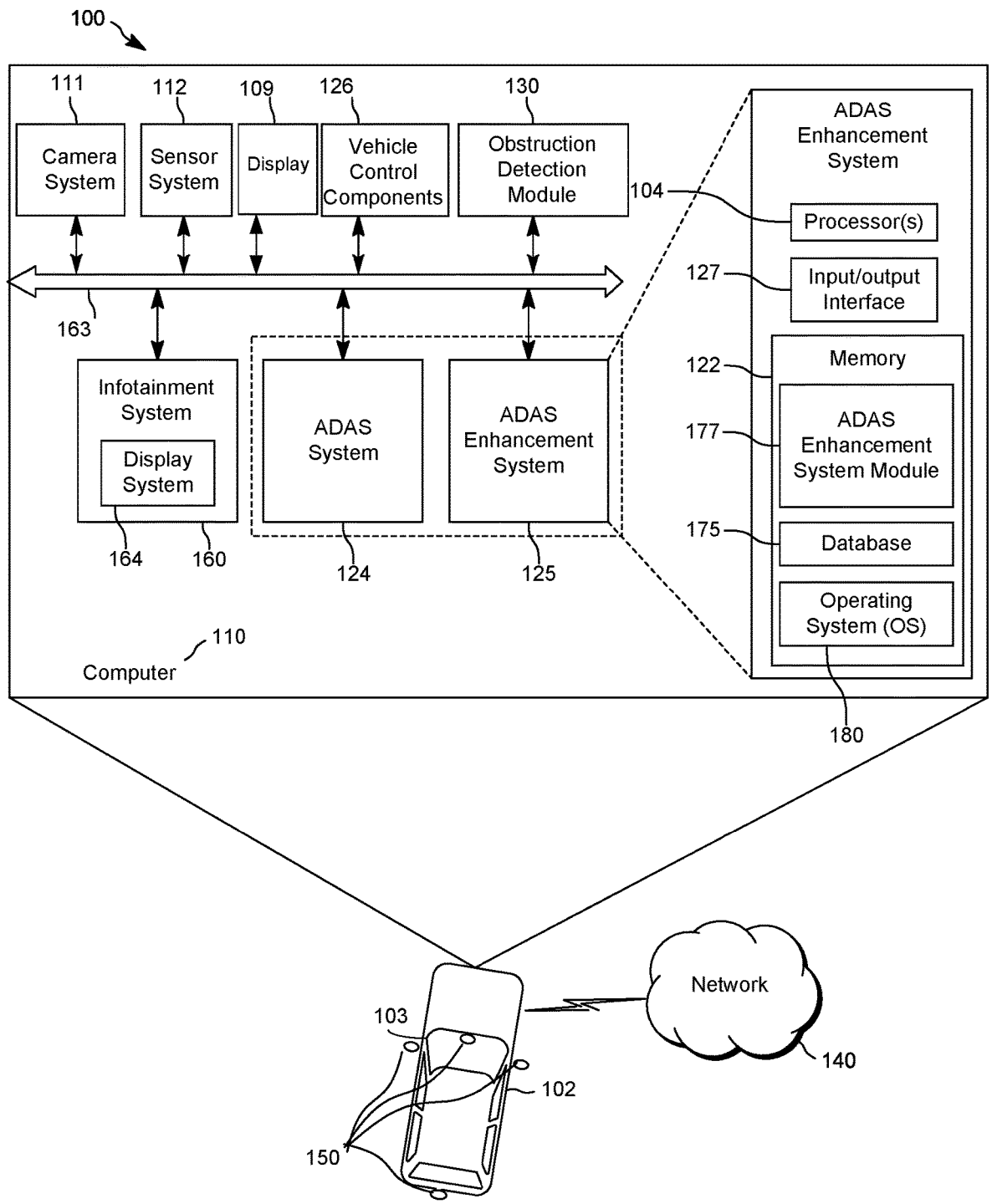
FIG. 1 illustrates an example system that includes a vehicle in accordance with an embodiment of the disclosure.

In terms of a general overview, this disclosure is generally directed to systems and methods for automatically detecting internally blocked rear and side view mirrors including detecting via sensors in the vehicle an obstruction preventing a driver from viewing a region of interest associated with a mirror, determining a permanence associated with the obstruction, and switching to a camera mode in lieu of the mirror when the obstruction has a permanence beyond a threshold.

In one or more embodiments, the detecting the obstruction includes detecting the obstruction via a line-of-sight sensor within the vehicle interior that detects obstructions within the vehicle of a region of interest associated with rear and side view mirrors.

In one or more embodiments, the switching to a camera mode includes displaying a view of the region of interest for the mirror using an exterior-facing camera instead of the mirror.

In one or more embodiments, the sensors include interior cameras, driver state monitoring cameras (DSMC) and interior, passenger and occupant cameras, LiDAR sensors, RADAR in a two-dimensional spectral plane sensors, ultrasonic sensors, and Ultra-Wideband (UWB) sensors monitoring and identifying obstruction of side-views and rear-view mirrors.

In one or more embodiments, the determining a permanence associated with the obstruction includes comparing a length of time of the obstruction with a preset threshold or a threshold set in a user profile.

In one or more embodiments, the determining the permanence associated with the obstruction includes applying machine learning to adaptively determine the permanence if the obstruction by identifying passengers and objects within the vehicle and associating a transient state to objects and identified passengers that are determined to be transient.

In one or more embodiments, the detecting the obstruction occurs upon the vehicle shifting from park to drive.

In one or more embodiments, the switching to the camera mode in lieu of the mirror includes displaying via a digital mirror or a display in the vehicle a camera view of the obstructed view. Further, in one or more embodiments, the switching to camera mode includes providing a heads up display (HUD) view of the region of interest in lieu of the mirror on a windshield of the vehicle or providing a view of the region of interest on a display associated with an integrated in-vehicle communications and entertainment system.

In one or more embodiments, the method further includes automatically assisting a driver of the vehicle upon determining that the obstruction is permanent beyond the threshold, including upon detecting that a line-of-sight to a specific mirror is obstructed, displaying camera views from exterior-facing cameras to enable driver monitoring of obstructed areas surrounding the vehicle, displaying camera views upon detection of tailgating behind the vehicle, and providing an alert to the driver if exigent circumstances are detected involving emergency vehicles, such as police and ambulance.

In one or more embodiments, the automatically assisting the driver includes detecting that the driver is attempting a maneuver while the mirror is obstructed and declined digital driver assistance and discouraging the maneuver by providing negative steering torque feedback, alerting the driver via haptic seat vibrations, alerting the driver via sounding an alarm, and providing an audible alert over a radio.

Another embodiment is directed to a system for a vehicle including a plurality of sensors within the vehicle, a plurality of exterior-faced cameras coupled to the vehicle, a memory coupled to the plurality of sensors and the plurality of exterior-faced cameras that stores computer-executable instructions, and a processor coupled to the memory, the processor configured to access the memory and execute the computer-executable instructions to detect by the sensors in the vehicle an obstruction preventing a driver from viewing a region of interest associated with a mirror in the vehicle, determine a permanence associated with the obstruction, and switch to a camera mode in lieu of the mirror when the obstruction has a permanence beyond a threshold.

In one or more embodiments, the processor configured to execute instructions to determine the permanence associated with the obstruction further executes instructions to apply machine learning to adaptively determine the permanence by identifying passengers and objects within the vehicle and associate a transient state to objects and identify passengers that are known to be transient.

Another embodiment is directed to a vehicle including a chassis, a motor coupled to the chassis, an on-board computer coupled to the chassis, the on-board computer including a memory and a processor coupled to the memory, the processor configured to execute one or more instructions to detect via sensors in the vehicle an obstruction preventing a driver from viewing a region of interest associated with a mirror, determine a permanence associated with the obstruction, and switch to a camera mode in lieu of the mirror when the obstruction has a permanence beyond a threshold.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations. Level 2 (L2) vehicles are partially automated with certain driving operations such as steering, braking, and lane control being controlled by a vehicle computer. The driver retains some level of control of the vehicle and may override certain operations. Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation.

FIG. 1 illustrates an example system 100 that includes a vehicle 102. The vehicle 102 may be one of various types of vehicles with a chassis and may be a gasoline powered vehicle, an electric vehicle, a hybrid electric vehicle, or an autonomous vehicle, that is configured as a Level 2 or higher automated or semi-automated vehicle. The system 100 may be implemented in a variety of ways and can include various types of devices. For example, the example system 100 can include some components that are a part of the vehicle 102. The components that can be a part of the vehicle 102 can include a vehicle on-board computer 110, and a sensor system 112 coupled to display 109 and cameras 111. Thus, on-board computer 110 may be coupled to vehicle 102 chassis, the on-board computer including at least a memory and a processor, such as memory 122 and processor 104 coupled to the memory wherein the processor 104 is configured to determine corrections to stabilize display 109.

The vehicle on-board computer 110 may perform various functions such as controlling engine operations (fuel injection, speed control, emissions control, braking, etc.), managing climate controls (air conditioning, heating etc.), activating airbags, and issuing an alert (check engine light, bulb failure, low tire pressure, vehicle in a blind spot, etc.).

The vehicle computer on-board 110, in one or more embodiments, may be used to support features such as passive keyless operations, remotely-controlled vehicle maneuvering operations, and remote vehicle monitoring operations. Vehicle on-board computer 110 may further control some maneuvers performed by the vehicle 102 during the self-parking operation (referred to in the industry as a Remote Park Assist (RePA) operation).

The vehicle on-board computer 110 may perform various functions such as controlling engine operations (fuel injection, speed control, emissions control, braking, etc.), managing climate controls (air conditioning, heating etc.), activating airbags, and issuing and alert (check engine light, bulb failure, low tire pressure, vehicle in a blind spot, etc.). In one or more embodiments, vehicle on-board computer 110 may enable a self-driving car or provide driver assistance. Thus, vehicle on-board computer 110 may further include an Advanced Driver-Assistance System ("ADAS") system 124 and an ADAS enhancement system 125, which is shown to further include, as one embodiment, the various components of the vehicle 102 that may be controlled, activated, and/or operated by the vehicle by the ADAS enhancement system 125.

In one implementation, the ADAS enhancement system 125 can be an independent device (enclosed in an enclosure, for example). In another implementation, some or all components of the ADAS enhancement system 125 can be housed, merged, or can share functionality, with vehicle on-board computer 110. For example, an integrated unit that combines the functionality of the ADAS enhancement system 125 can be operated by a single processor and a single memory device. In the illustrated example configuration, the ADAS enhancement system 125 includes a processor 104, an input/output interface 127, and memory 122, ADAS Enhancement System Module 177, database 175 and operating system 180. The input/output interface 127 is configured to provide communications between the ADAS enhancement system 125 and other components such as the sensors 150 the vehicle control components and any infotainment system, if present. The memory 122, which is one example of a non-transitory computer-readable medium, may be used to store an operating system (OS) 180, a database 175, and various code modules such as an ADAS enhancement system module 177. The modules, including ADAS enhancement system module 177, may be provided in the form of computer-executable instructions that can be executed by processor 104 for performing various operations in accordance with the disclosure.

In one or more embodiments, communications network 140 includes a cellular or Wi-Fi communication link enabling vehicle 102 to communicate with network 140, which may include a cloud-based network or source for transferring data in accordance with this disclosure.

Vehicle 102 may further include a set of nodes, sensors and cameras 150 such as radars mounted upon vehicle 102 in a manner that allows the vehicle on-board computer 110 to communicate with devices such as camera system 111 and sensor system 112 and collect data. Examples of may include sensors, radars and/or emitters capable of detecting objects, distances such as ultrasonic radar, LiDAR, cameras and the like. In one or more embodiments, sensors/cameras may further include one or more of Bluetooth®-enabled sensors, or Bluetooth® low energy (BLE)-enabled sensors, wheel speed sensors, accelerometers, rate sensors, GPS sensors, and steering wheel sensors. Sensors 150 may include exterior-faced cameras located where mirrors may be located such as rear view mirrors and side view mirrors. Also shown is a sensor/camera located at the rear of the vehicle.

Figure 2:
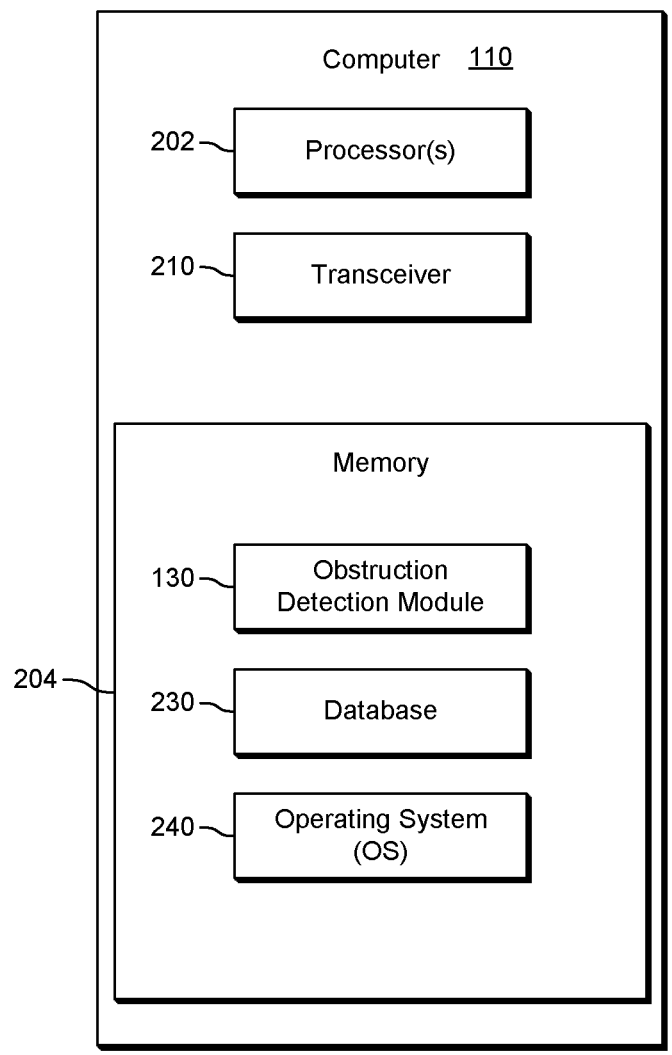
FIG. 2 illustrates some example functional blocks that may be included in a system for a vehicle in accordance with an embodiment of the disclosure.

Referring to FIG. 2, vehicle on-board computer 110 is shown configured to execute various operations in accordance with one or more embodiments.

As shown, in one embodiment, on-board computer 110 includes components such as processor 202, transceiver 210, and memory 204, which is one example of a non-transitory computer-readable medium, may be used to store the operating system (OS) 240, database 230, and various modules such as obstruction detection module 130. One or more modules in the form of computer-executable instructions may be executed by the processor 210 for performing various operations in accordance with the disclosure. More particularly, obstruction detection module 130 may be executed by the processor 210 in accordance with the disclosure, for determining whether a mirror view should be shown on display 109, when an obstruction is detected.

Referring back to FIG. 1, vehicle 102 includes sensor system 112, exterior-facing camera system 111 and one or more displays 109 which is coupled to receive signals from obstruction detection module 130. More specifically, according to embodiments, obstruction detection module 130 receives inputs from sensor system 112 and camera system 111 and determines whether a mirror obstruction is permanent or temporary. For example, a rear view or side mirror may be obstructed beyond a threshold length of time which may be substituted by an exterior-facing camera view on a display 109 in lieu of the mirror. In one or more embodiments, display 109 may be within an obstructed mirror, a heads up display, or on a dashboard within vehicle 102. Mirror obstructions may block regions of interest to a driver including line-of-sight regions to a mirror or regions that should be reflected in a mirror, such as vehicles and objects outside of vehicle 102.

As shown on FIG. 1, sensors 150 for sensor system 112 within vehicle 102 include camera(s) 150 which include exterior-facing cameras and interior cameras. In one or more embodiments, the data received by camera(s) 150 may be provided to module 130 to determine whether an obstruction is permanent and/or requiring a camera view in lieu of a mirror. Cameras may have interior cameras that include image recognition to determine whether or not a line-of-sight is blocked. The image recognition may also include image recognition that reacts to more permanent conditions in coordination with module 130 to alter display 109 to camera view. Thus, for example, if an interior camera with image recognition determines a blockage after a vehicle is in gear, module 130 may automatically provide a camera view in lieu of a mirror view. In some embodiments, mirrors may include displays that enable a camera view where a mirror may be located. In vehicles without camera displays included in rear view and/or side view mirrors, other displays may automatically camera views of detected blocked mirrors.

Advantageously, embodiments include receiving data from sensors 150 while vehicle 102 is moving. For example, once vehicle 102 is in drive or in a gear, sensors 150 may detect interior vehicle obstructions that would affect driver eye gaze to different mirrors and automatically respond with a camera display.

Figure 3:
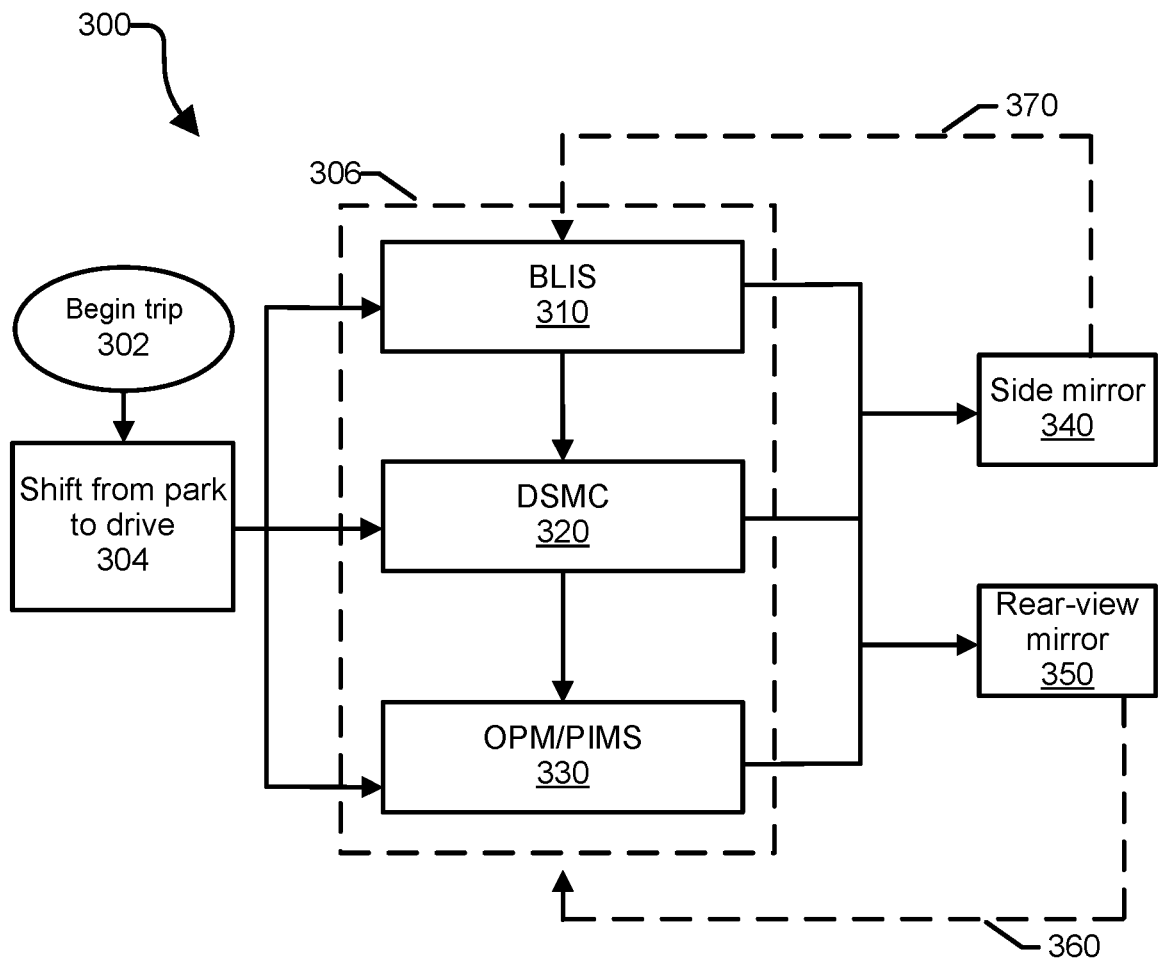
FIG. 3 illustrates a flow diagram illustrating an exemplary flow diagram for detecting an obstruction of a mirror in accordance with an embodiment of the disclosure.

Referring now to FIG. 3, a flow diagram 300 illustrates a diagram of steps received by module 130 for detecting obstructions. A trip begins at step 302, when a driver places vehicle 102 into drive at step 304.

As shown, step 304 initiates module 130 in step 306 which provides for interacting with different vehicle sensor systems 112 such as blind spot information system (BLIS) 310, driver state monitoring camera (DSMC) 320 and occupant presence monitor (OPM)/passenger/interior monitoring system (PIMS) 330 that sense and report to vehicle computer 110 different states of the interior including potential blockages. Each of BLIS, DSMC and OPM/PIMS may be included in sensor system 112 to interact with obstruction detection module 130 to provide instructions for displaying blocked mirror views.

Flow diagram 300 continues with steps 340 and 350 interacting with side mirrors 340 or rear-view mirror 350 as a result of determining a blockage and determining a permanence of the blockage. Next steps 370 and 360 return to block 306 to continue monitoring for blockages of the mirrors. For example, BLIS, DSMC, or OPM/PIMS and other sensor systems capturing camera images from sensors system 112 and sensor/cameras 150 for example receiving images or video from cameras within vehicle 102.

In one embodiment, sensors may estimate a position of the driver or a passenger through the DSMC images. Image recognition and line-of-sight calculations, including machine learning and user profile data may then determine potential blockages of a view toward mirrors and whether mirror images are blocked by interior blockages preventing either the driver from seeing a mirror or from the mirror being able to reflect appropriate and helpful information to the driver.

Figure 4:
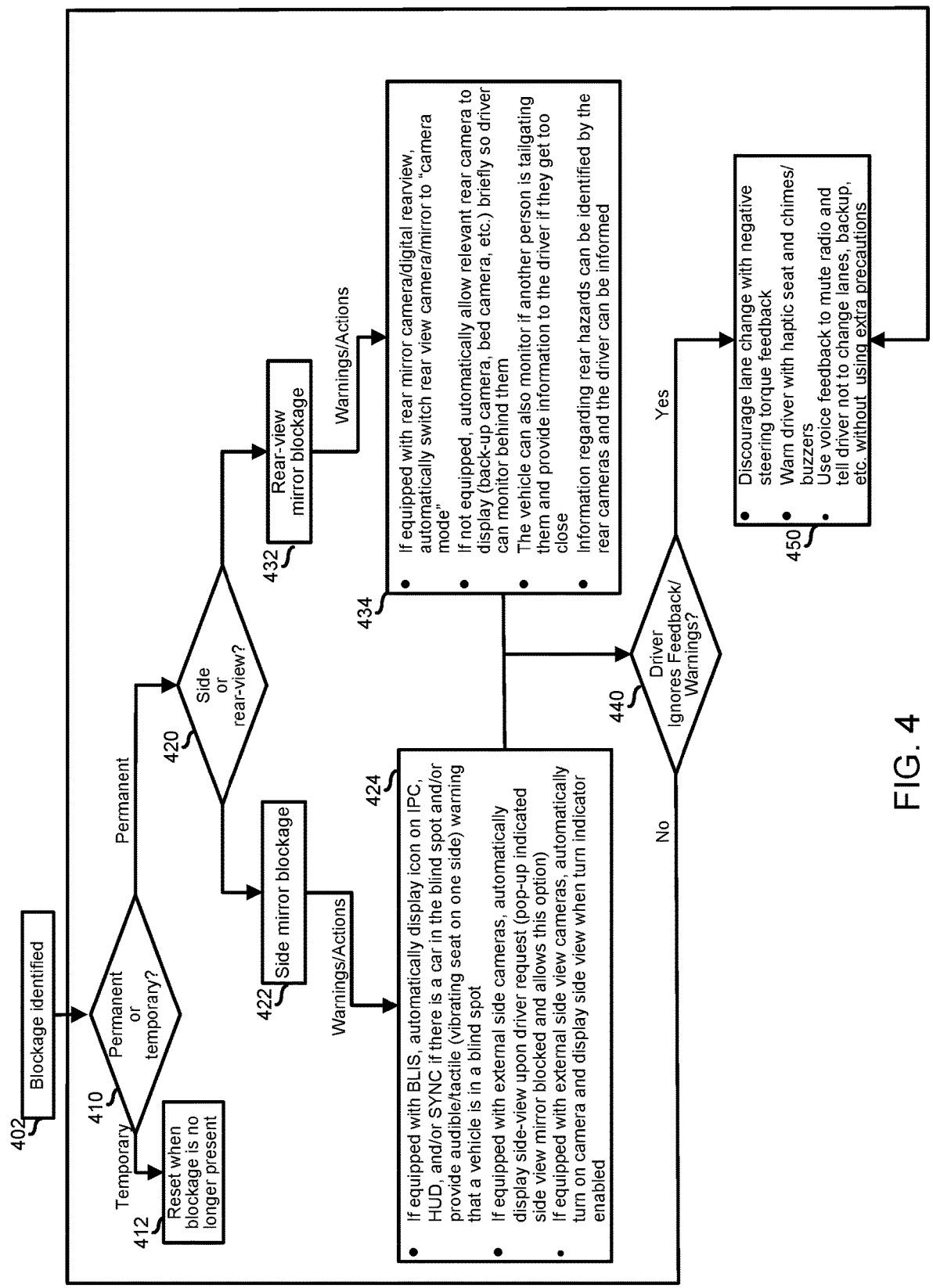
FIG. 4 illustrates an exemplary flow diagram of a of blockage monitoring in accordance with an embodiment of the disclosure.

Referring now to FIG. 4, a flow diagram illustrates a method for blockage monitoring. Block 402 initiates the flow with blockage identified. For example, as described above with respect to FIG. 3, sensor system 112 with different sensors may identify a blockage. Next, decision block 410 provides for determining if the blockage is permanent or temporary. If Temporary, block 412 provides for resetting when no blockage is no longer present. If permanent, block 420 provides for a decision of whether the blockage is a side or a rear view that is blocked. If a side mirror is obstructed, block 422 directs alerts and actions should take place. More specifically, block 424 provides that if a car is in a blind spot and vehicle 102 is equipped with BLIS, module 130 automatically displays an icon using IPC, heads up display (HUD) and/or a proprietary driver information system such as SYNC™ by FORD™ Motor Company. Module 130 may automatically provide an audible/tactile (vibrating seat on one side) alert that a vehicle is in their blind spot. If equipped with external side cameras, module 130 may automatically display side-views upon driver request (pop-up indicating side view mirror blocked may allow this option). If equipped with external side view cameras, module 130 may automatically turn on camera and display side view when a turn indicator is enabled.

If a rear-view mirror is obstructed, block 432 provides for alerts and actions as shown in block 434. If equipped with rear mirror camera/digital rearview, module 130 provides for automatically switching from rear view camera/mirror to "camera mode". If not equipped with a combination rear mirror camera/digital rearview, module 130 provides for automatically allowing relevant rear cameras to display such as back up camera, bed camera, and the like, briefly so driver can monitor behind vehicle 102. Block 434 further provides that module 130 may also monitor if another person is tailgating them and provide information to the driver if they get to close. Further, block 434 provides that information regarding if emergency vehicles such as a police car/ambulance is behind vehicle 102, module 130 may use sensors/cameras to identify such emergency vehicles using exterior-facing cameras, such as a rear camera and inform a driver.

Next, decision block 440 queries whether a driver is ignoring any of the feedback/alerts identified in block 424 and block 434. If so, block 450 provides for discouraging lane changes using negative steering torque feedback, alerting a driver using haptic seat vibrations, chimes and buzzers, and using voice feedback to mute radio and inform a driver not to change lanes, backup or perform another maneuver without using extra precautions.

If the driver does not ignore the feedback/alert, the flow returns to block 402. Likewise, after providing an alert to a driver as described in block 450, the flow returns to block 402.

Figure 5:
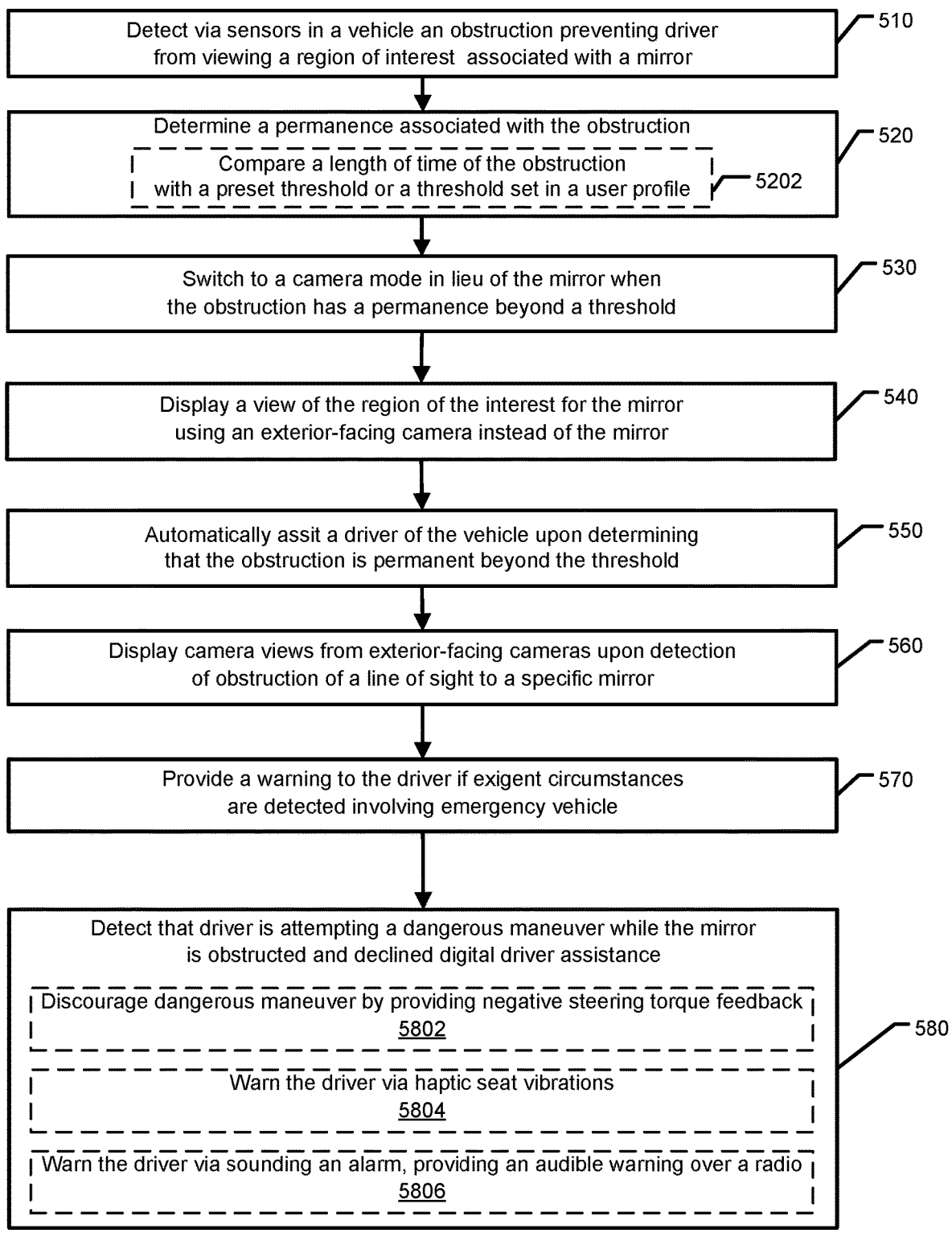
FIG. 5 illustrates a flow diagram of a method in accordance with an embodiment of the disclosure.

Referring now to FIG. 5, a flow diagram illustrates a method in accordance with an embodiment. As shown, block 510 provides for detecting via sensors in a vehicle, an obstruction preventing a driver from viewing a region of interest associated with a mirror. For example, as described above with respect to FIG. 1, sensor system 112 may detect using cameras, sensors, radar and the like an interior blockage obstructing a mirror view from within vehicle 102.

In one or more embodiments, the determining an obstruction may include detecting the obstruction via the plurality of sensors including interior cameras, driver state monitoring cameras (DSMC) and interior, passenger and occupant cameras, LiDAR sensors, RADAR in a two-dimensional spectral plane sensors, line-of-sight sensors, ultrasonic sensors, and Ultra-Wideband (UWB) sensors that monitor and identify obstructions within the vehicle of the sensors include interior cameras, driver state monitoring cameras (DSMC) and interior, passenger and occupant cameras, LiDAR sensors, RADAR with two-dimensional spectral plane sensors, ultrasonic sensors, and Ultra-Wideband (UWB) sensors monitoring and identifying obstructions of side-view and rear-view mirrors. As shown in FIG. 1, sensor system 112 and camera system 111 may interact with module 130 in cooperation with driver and passenger monitoring cameras, a blind spot information system (BLIS), a SYNC™ system, and a heads up display (HUD) system and the like to detect and interact with a driver.

Block 520 provides for determining a permanence associated with the obstruction. For example, a time threshold associated with a sensor may indicate a permanence. In other embodiments, interior cameras may be equipped with image recognition features that may determine that an object is permanent or temporary. For example, a dog would be a temporary blockage because dogs typically do not stay in a same place. A kennel with a dog inside would be recognized as a more permanent obstruction.

Within block 520 is block 5202 that provides for comparing a length of time of the obstruction with a preset threshold or a threshold set in a user profile. For example, a length of time could be a few seconds such as three to five seconds and any time beyond the threshold may dictate that the obstruction is permanent. In other embodiments, a user profile may indicate that a longer or shorter threshold should apply based on the user's own experience, for example.

In other embodiments, determining a permanence of an obstruction includes applying machine learning to adaptively determine the permanence of the obstruction by identifying passengers and objects within the vehicle and associating a transient state to objects and identified passengers that are determined to be transient.

In one or more embodiments, the determining an obstruction may include detecting the obstruction via the plurality of sensors including interior cameras, driver state monitoring cameras (DSMC) and interior, passenger and occupant cameras, LiDAR sensors, RADAR in a two-dimensional spectral plane sensors, line-of-sight sensors, ultrasonic sensors, and Ultra-Wideband (UWB) sensors that monitor and identify obstructions within the vehicle of the sensors include interior cameras, driver state monitoring cameras (DSMC) and interior, passenger and occupant cameras, LiDAR sensors, RADAR with two-dimensional spectral plane sensors, ultrasonic sensors, and Ultra-Wideband (UWB) sensors monitoring and identifying obstructions of side-view and rear-view mirrors.

Block 530 provides for switching to a camera mode in lieu of the mirror when the obstruction has a permanence beyond a threshold. For example, if a permanence is determined, a mirror may be switched to a camera mode for that mirror. In other embodiments, if a permanence is determined, a camera mode may include using different displays, such as a HUD display, a central display in vehicle 102 or other location within the vehicle.

Block 540 provides for displaying a view of the region of interest for the mirror using an exterior-facing camera instead of the mirror. For example, when using a camera mode, module 130 may direct that a feed or imaging from exterior-facing cameras that may be included in sensor system 112 or part of camera system 111, such as sensors 150 shown in FIG. 1 as including rear-view mirror cameras and rear facing cameras, may display a same region of interest as would have been shown if a mirror was not blocked. Thus, in some embodiments, the same region of interest as would have been shown may be displayed. In other embodiments, the closest images available helpful to a driver would be displayed. For example, if the only exterior facing camera is a rear facing centrally located camera, then that view would be shown.

Block 550 provides for automatically assisting a driver of the vehicle upon determining that the obstruction is permanent beyond the threshold. For example, if image recognition, a timer, or a user profile determine that a permanent obstruction is present, an automatic display of a camera view would occur. The automatic display can be via a heads up display (HUD), an audible alert, or an automatic display of an exterior-facing camera or the like.

Block 560 provides for displaying camera views from exterior-facing cameras upon detection of obstruction of a line-of-sight to a specific mirror. For example, if a side view mirror is determined to be obstructed by a passenger or a box blocking a driver's view, a camera located at the location of the side view mirror may be automatically displayed. Likewise, if a rear view mirror is blocked due to an overloaded vehicle or passengers blocking the view, a rear-facing camera may be automatically displayed.

Block 570 provides for providing an alert to the driver if exigent circumstances are detected involving emergency vehicles. For example, if vehicle 102 includes sensors or cameras that have image recognition or the ability to identify emergency vehicles via receiving an indication of an exigent circumstance or the like, an audible alert, a haptic alert, or a displayed alert over display 109 may automatically occur.

Block 580 provides for detecting that a driver is attempting a maneuver while the mirror is obstructed and declined digital driver assistance. For example, if a mirror is obstructed as detected by image recognition, machine learning, cameras and sensors, and the obstruction remains unseen to the driver due refusal to display an exterior camera appropriate for a helpful view, a detection mechanism may automatically be instantiated by module 130.

Optional block 5802 within block 580 provides for discouraging maneuvers by providing negative steering torque feedback. For example, when a maneuver by a driver is detected by module 130, an automatic negative torque with the steering wheel may discourage a driver.

Optional block 5804 within block 580 provides for alerting a driver with haptic seat vibrations. For example, module 130 may direct a driver's seat to provide vibrations on a left side of the seat to direct the driver to pay attention to a left side of a vehicle if a danger is present on a left side. Vibrations could also be of a full seat to discourage maneuvers directly in front of or behind vehicle 102.

Optional block 5806 provides for alerting a driver via sounding an alarm and providing an audible alert over a radio. For example, if a predicted maneuver is detected based on detection of an obstruction of a mirror, an automatic alarm including an automatic volume lowering of a radio and audible alert may automatically occur.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, via sensors disposed in the vehicle, an obstruction preventing a driver from viewing a region of interest associated with a mirror;
   determining a permanence associated with the obstruction;
   determining that a time period associated with the permanence is greater than a threshold time;
   displaying, using one or more cameras of the vehicle, content associated with the region of interest;
   providing a notification message associated with the obstruction;
   detecting an attempt to operate the vehicle after the notification message is provided; and
   providing a negative torque feedback via a steering wheel of the vehicle.

2. The method of claim 1, wherein detecting the obstruction includes:
   detecting the obstruction using a line-of-sight sensor that is disposed within the vehicle, wherein the line-of-sight sensor is configured to detect the obstruction within the vehicle.

3. The method of claim 2, wherein the line-of-sight sensor includes interior cameras, driver state monitoring cameras (DSMC), occupant cameras, LiDAR sensors, RADAR sensors, ultrasonic sensors, and/or Ultra-Wideband (UWB) sensors.

4. The method of claim 1, wherein:
   the one or more cameras are exterior-facing cameras.

5. The method of claim 1, wherein the threshold time is provided in a driver profile associated with the driver.

6. The method of claim 1, wherein determining the permanence associated with the obstruction further comprises:
   applying machine learning to adaptively determine the permanence of the obstruction by identifying passengers and objects within the vehicle that comprise the obstruction and associating a transient state therewith.

7. The method of claim 1, wherein prior to detecting the obstruction:
  detecting, by the vehicle, a state change from park to drive; and
  detecting the obstruction in response to detecting the state change.

8. The method of claim 1, wherein displaying the content of the region of interest includes (i) providing a heads up display (HUD) view of the region of interest associated with the mirror and/or (ii) displaying the region of interest associated with the mirror on a display of an integrated in-vehicle communications and entertainment system.

9. The method of claim 1 further comprising automatically assisting the driver of the vehicle upon determining that the time period associated with the permanence is greater than a threshold time.

10. A system for a vehicle comprising:
  a plurality of sensors located within the vehicle;
  a plurality of exterior-facing cameras coupled to the vehicle;
  a memory that stores computer-executable instructions; and
  a processor coupled to the memory, the processor configured to access the memory and execute the computer-executable instructions to:
  detect an obstruction preventing a driver from viewing a region of interest associated with a mirror of the vehicle;
  determine a permanence associated with the obstruction;
  determine that the permanence exceeds a threshold time;
  display, using one or more of the plurality of the exterior-facing cameras, a view of the region of interest;
  provide a notification associated with the obstruction;
  detect an attempt to operate the vehicle; and
  provide feedback to the driver to discourage the driver from operating the vehicle.

11. The system of claim 10, wherein the plurality of sensors comprise interior cameras, driver state monitoring cameras (DSMC), occupant cameras, LiDAR sensors, RADAR sensors, ultrasonic sensors, and/or Ultra-Wideband (UWB) sensors.

12. The system of claim 10, wherein the threshold time is provided in a driver profile associated with the driver.

13. The system of claim 10 wherein the processor configured to execute instructions to:
  apply machine learning to adaptively determine the permanence of the obstruction by identifying passengers and objects within the vehicle that comprise the obstruction and associating a transient state therewith.

14. The system of claim 10 wherein the processor configured to execute instructions to, prior to detecting the obstruction:
  detect a change in a state of the vehicle from park to drive; and
  detect the obstruction in response to the change in the state of the vehicle.

15. The system of claim 10, wherein the processor further executes instructions to:
  automatically assist the driver of the vehicle upon determining that the permanence exceeds the threshold time.

16. The system of claim 10, wherein to provide the feedback to the driver, the processor is configured to execute instructions to:
  provide a negative steering torque feedback, alert the driver via haptic seat vibrations, alert the driver via sounding an alarm, and/or providing an audible alert over a radio.

17. A vehicle comprising:
  a sensor disposed within a passenger cabin of the vehicle;
  a camera configured to capture image data external to the vehicle;
  a memory and a processor coupled to the memory, the sensor and the camera, the processor configured to execute one or more instructions to:
  detect, using the sensor, an obstruction located within the vehicle that is preventing a driver from viewing a region of interest associated with a mirror of the vehicle;
  determine a permanence associated with the obstruction;
  determine that the permanence exceeds a time threshold;
  display, using the camera, a view of the region of interest;
  provide notification associated with the obstruction;
  detect an attempt to operate the vehicle; and
  provide feedback to discourage the driver from operating the vehicle,
  wherein the feedback includes a negative steering torque feedback.

18. The vehicle of claim 17, wherein the obstruction includes objects located inside the vehicle.

19. The vehicle of claim 17, wherein the processor is further configured to execute one or more instructions to, prior to detecting the obstruction, detect a change in a state of the vehicle from park to drive.

\* \* \* \* \*